United States Patent
Zuckerberg et al.

(10) Patent No.: US 7,945,653 B2
(45) Date of Patent: May 17, 2011

(54) TAGGING DIGITAL MEDIA

(75) Inventors: Mark Zuckerberg, Palo Alto, CA (US); Aaron Sittig, Palo Alto, CA (US); Scott Marlette, Palo Alto, CA (US)

(73) Assignee: Facebook, Inc., Palo Alto, CA (US)

( * ) Notice: Subject to any disclaimer, the term of this patent is extended or adjusted under 35 U.S.C. 154(b) by 962 days.

(21) Appl. No.: 11/580,210

(22) Filed: Oct. 11, 2006

(65) Prior Publication Data

US 2008/0091723 A1    Apr. 17, 2008

(51) Int. Cl.
*G06F 15/173* (2006.01)
(52) U.S. Cl. ......... 709/223; 709/206; 709/217; 709/225
(58) Field of Classification Search .................. 709/204, 709/206, 217, 223, 225, 219
See application file for complete search history.

(56) References Cited

U.S. PATENT DOCUMENTS

| | | | | |
|---|---|---|---|---|
| 6,542,936 | B1* | 4/2003 | Mayle et al. ................. | 709/203 |
| 6,687,878 | B1* | 2/2004 | Eintracht et al. ............. | 715/230 |
| 7,068,309 | B2* | 6/2006 | Toyama et al. ............... | 709/219 |
| 7,249,123 | B2 | 7/2007 | Elder | |
| 7,668,405 | B2* | 2/2010 | Gallagher ..................... | 382/305 |
| 7,886,024 | B2* | 2/2011 | Kelly et al. ................... | 709/219 |
| 2002/0103813 | A1* | 8/2002 | Frigon ........................ | 707/104.1 |
| 2005/0235062 | A1* | 10/2005 | Lunt et al. .................... | 709/217 |
| 2006/0048059 | A1* | 3/2006 | Etkin ............................ | 715/745 |
| 2006/0218225 | A1 | 9/2006 | Hee Voon | |
| 2006/0251292 | A1* | 11/2006 | Gokturk et al. ............... | 382/103 |
| 2006/0253491 | A1* | 11/2006 | Gokturk et al. ............. | 707/104.1 |
| 2006/0264209 | A1* | 11/2006 | Atkinson et al. ........... | 455/422.1 |
| 2007/0016689 | A1* | 1/2007 | Birch ............................. | 709/241 |
| 2007/0118525 | A1* | 5/2007 | Svendsen .......................... | 707/9 |
| 2007/0159651 | A1* | 7/2007 | Disario et al. ............... | 358/1.15 |
| 2007/0162458 | A1* | 7/2007 | Fasciano ......................... | 707/10 |
| 2007/0255785 | A1* | 11/2007 | Hayashi et al. ............... | 709/204 |
| 2007/0266003 | A1* | 11/2007 | Wong et al. ...................... | 707/3 |
| 2008/0086458 | A1* | 4/2008 | Robinson | |
| 2008/0091723 | A1* | 4/2008 | Zuckerberg et al. ....... | 707/104.1 |

OTHER PUBLICATIONS

Shneiderman, et al., "Direct Annotation: A Drag and Drop Strategy for labeling Photos", Aug. 2000, International Conference on Information Visualization.*
Brush et al., "Notification for shared Annotation of Digital Documents", Apr. 2002, ACM, CHI vol. 4 Issue #1.*
Marlow et al., "HT06, Tagging Paper, Taxonomy, Flickr, Academic Article, To Read", Aug. 2006, ACM.*
U.S. Appl. No. 11/701,566, filed Feb. 2, 2007, Jed Stremel, System and Method for Automatic Population of a Contact File with Contact Content and Expression Content.
U.S. Appl. No. 11/893,797, filed Aug. 16, 2007, Yung-Fang Juan, System and Method for Invitation Targeting in a Web-Based Social Network.
U.S. Appl. No. 60/966,442, filed Aug. 28, 2007, Ezra Callahan, System and Method for Incorporating an Entity or Group other than a Natural Person into a Social Network.

* cited by examiner

*Primary Examiner* — Ramy M Osman
(74) *Attorney, Agent, or Firm* — Fenwick & West LLP

(57) ABSTRACT

A method for tagging digital media is described. The method includes selecting a digital media and selecting region within the digital media. The method may further include associating a person or entity with the selected region and sending a notification of the association the person or entity or a different person or entity. The method may further include sending advertising with the notification.

34 Claims, 11 Drawing Sheets

TAGGING DIGITAL MEDIA

CROSS-REFERENCE TO RELATED APPLICATIONS

The present application incorporates by reference U.S. Provisional Patent Application Ser. No. 60/750,844 filed on Dec. 14, 2005 for "Systems and Methods for Social Mapping," U.S. Provisional Patent Application Ser. No. 60/753,810 filed on Dec. 23, 2005 for "Systems and Methods for Social Timeline," U.S. patent application Ser. No. 11/493,291 filed on Jul. 25, 2006 for "Systems and Methods for Dynamically Generating a Privacy Summary," U.S. patent application Ser. No. 11/502,757 filed on Aug. 11, 2006 for "Systems and Methods for Generating Dynamic Relationship-Based Content Personalized for Members of a Web-Based Social Network," U.S. patent application Ser. No. 11/503,093 filed on Aug. 11, 2006 for "Systems and Methods for Measuring User Affinity in a Social Network Environment," U.S. patent application Ser. No. 11/503,037 filed on Aug. 11, 2006 for "Systems and Methods for Providing Dynamically Selected Media Content to a User of an Electronic Device in a Social Network Environment," and U.S. patent application Ser. No. 11/503,242 filed on Aug. 11, 2006 for "System and Method for Dynamically Providing a News Feed About a User of a Social Network."

FIELD OF THE INVENTION

The present invention relates generally to internet digital content, and more particularly to systems and methods for tagging digital media.

DESCRIPTION OF RELATED ART

Various websites have developed systems for organizing photos into albums available for viewing by other network users.

Some social networking websites offer mechanisms that may allow the user to select particular photos or albums for immediate viewing. Typically, however, these photos are disparate and disorganized. In other words, the user must spend time visually searching through albums, photo by photo, for individuals or objects that are not presented in a coherent or consolidated manner. Often, many of the photos do not depict persons or objects of interest to the user. Just as often, the user remains unaware of the existence of some photos that were overlooked. What is needed is a method to organize digital media and automatically generate notifications to persons or entities interested in the digital media.

SUMMARY OF THE INVENTION

The present invention includes systems and methods for tagging digital media in a social network environment administered by a social network server. In various embodiments, digital media may include digital images, digital video, digital audio, digital audio visual media, computer games, digital books, digital text, and/or the like. A user of a social network may upload digital media (e.g., a digital image) to a file (e.g., an album) on their web page thus becoming a media owner of the digital image. The media owner may select and tag a region of the image by clicking on a point in the digital image to select the region and typing appropriate text to tag the region. The media owner may select and tag multiple regions. In one embodiment, the tagged region is indicated by a border superimposed over the digital image. In one embodiment, the tagged text is displayed with the image, and the border is viewed by selecting the tagged text (e.g., by placing the cursor over the tagged text). Users in the social network environment may visit the media owner's web page via the network and select the tagged text to view the tagged region in the digital image. In some embodiments, other users can tag the media owner's images.

In some embodiments, the tagged text includes contact information (e.g., an email address) identifying a tagged user within the social network environment. In various embodiments, contact information includes an email address, a phone number, a mailing address, a user account, a user name, a text message number, a voice mail user number, a pager number, an instant message address, and/or the like. Contact information may also include a name of a person or entity or information regarding a third person or entity. The tagged user may receive an automatic email notification via the social network that his or her email address has been used to tag the digital image. The notification may include a hyperlink providing the tagged user an opportunity to view the digital media and tagged region, and/or visit the media owner's web page. The hyperlink may further provide the tagged user an opportunity to confirm or disaffirm the tagged text that includes the email address. When the tagged text has been disaffirmed, tags may not be displayed to other users visiting the media owner's web page.

In some embodiments, the tagged text includes contact information (e.g., an email address) for a tagged non-user outside the social network environment (non-member). The tagged non-user may receive an automatic email notification via the internet that his or her email address has been used to tag the digital media. The notification may include a hyperlink providing the tagged non-user an opportunity to view the digital media and the tagged region and, optionally, visit the owner's web page. The hyperlink may further provide the tagged non-user an invitation to become a member of the social network environment. Upon becoming a member of the social network environment, the tagged non-user and may visit the owner's web page (as a tagged user) and confirm or disaffirm the tagged text including the tagged non-user's email address.

Exemplary embodiments describe methods for tagging digital media. In some embodiments, the methods include selecting the digital media and selecting a region within the digital media. The method further includes associating a person or entity with the selected region within the digital media and may further include sending a notification of the association to the person or entity, or to a third person or entity.

DETAILED DESCRIPTION

Figure 1:
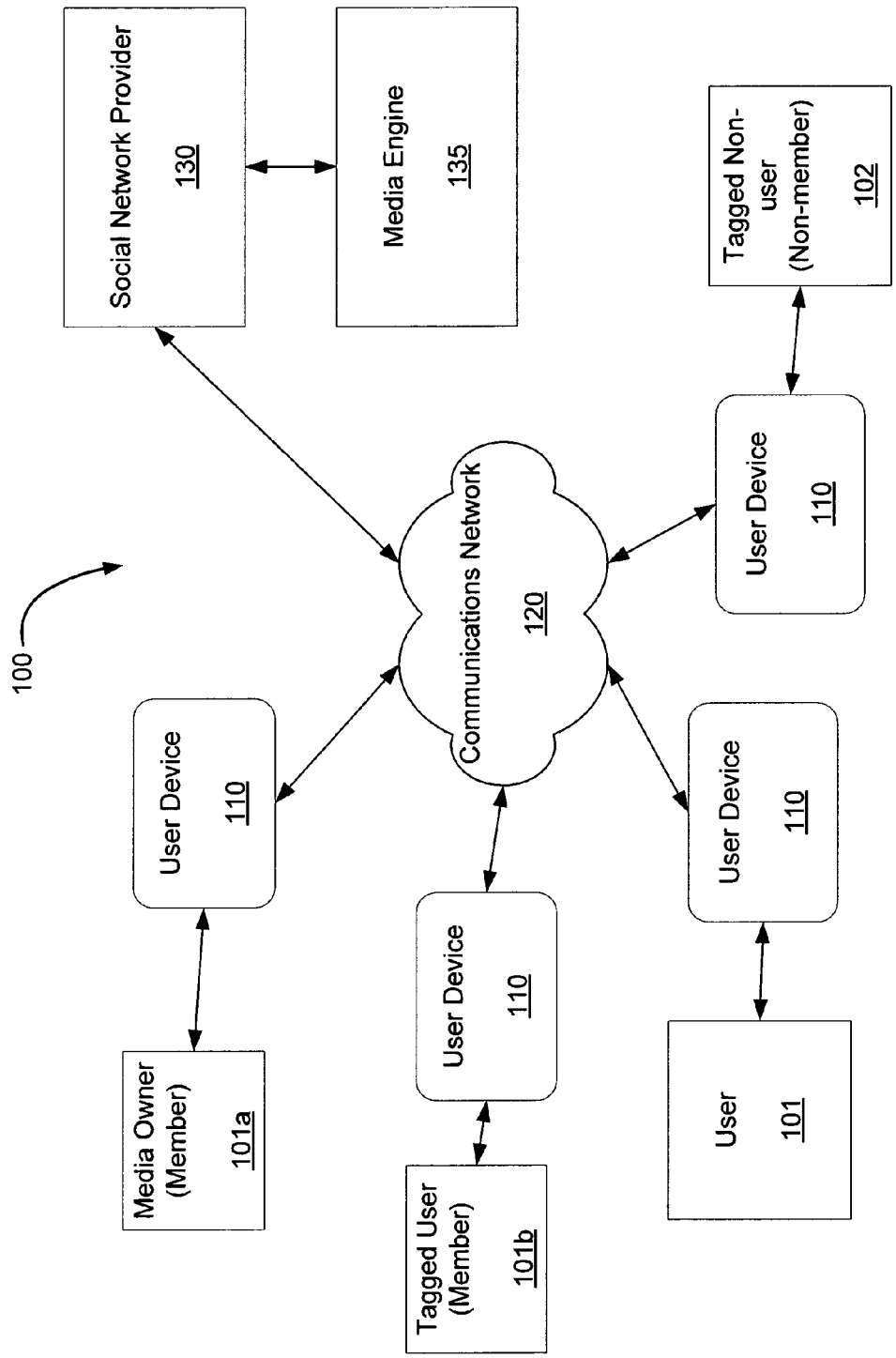
FIG. 1 illustrates an exemplary social network environment for tagging digital media.

FIG. 1 illustrates an exemplary environment for tagging digital media, such as in a social network environment 100. One or more users 101, at user devices 110, are coupled to a social network provider 130 via a communications network 120. In various embodiments, user devices 110 include a computer terminal, a personal digital assistant (PDA), a wireless telephone, a digital camera, and/or the like. In various embodiments, the communications network 120 includes a local area network (LAN), a wide area network (WAN), a wireless network, an intranet, an internet, and/or the like. In one embodiment, users 101 comprise various types of users, including a user who is a digital media owner 101a (e.g., a user 101 who uploads digital media) and a user who is a tagged user 101b (e.g., a user 101 associated with a region in the digital media). In various embodiments, digital media includes digital images, digital video, digital audio, digital audiovisual media, digital text, digital books, online game icons, online game avatars, and/or the like. For the purposes of illustration, digital images are discussed herein. However, one skilled in the art would understand that the discussion applies equally to a wide variety of digital media. The use of digital images is not intended to be limiting.

The social network provider is an entity or person that provides social networking services, communication services, dating services, company intranets, online games, and so forth. For example, the social network provider 130 may host a website that allows one or more users 101, e.g., the media owner 101a and/or the tagged user 101b, at one or more user devices 110, to communicate with one another via the website. The social network environment 100 offers users 101, e.g., the media owner 101a, an opportunity to connect or reconnect with the one or more other users 101, e.g., the tagged user 101b and/or other users 101 that attended, for example, the same university as the media owner 101a. In some embodiments, a social network environment 100 includes a segmented community. A segmented community according to one embodiment is a separate, exclusive or semi-exclusive social network environment 100, or social network environment 100 wherein each user 101 who is an authenticated segmented community member may access and interact with other members of their respective segmented community.

The social network environment 100 may further offer users 101 an opportunity to connect or reconnect with one or more non-users outside the social network environment 100. One example of such non-user is a tagged non-user 102. The tagged non-user 102 may be coupled to the social network provider 130, at a user device 110 via the communications network 120.

The social networking environment 100 further includes a media engine 135. The media engine 135 is configured to provide the user 101 media services for manipulating media (e.g., digital images) within the social network environment 100. Examples of digital image manipulation include creating albums within the user's 101 web page, uploading digital images to the user's 101 albums, associating captions with the digital images, tagging the digital images with information about regions within the digital images, stacking digital images, deleting digital images, deleting albums, and the like.

Figure 2:
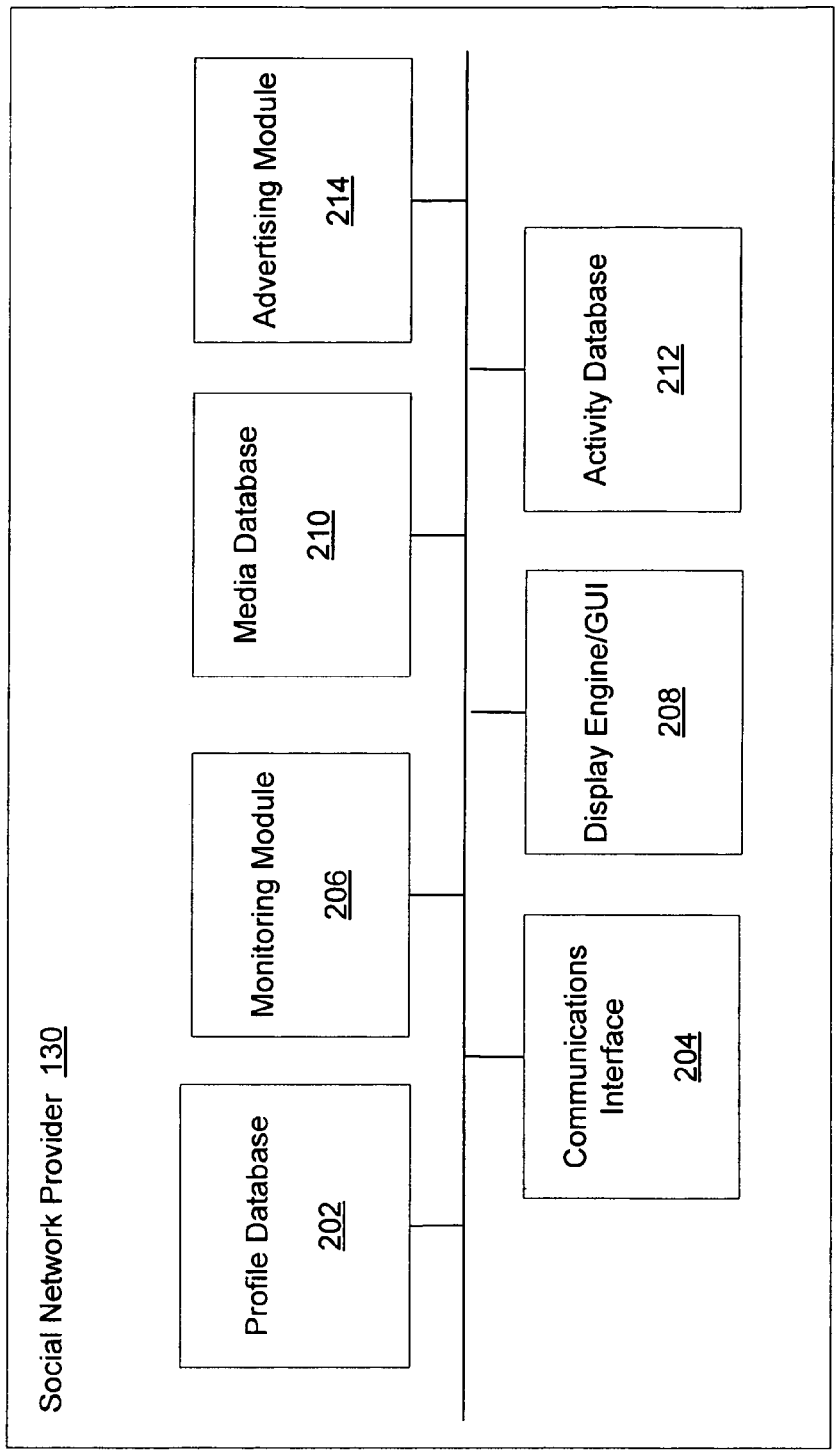
FIG. 2 is a block diagram of an exemplary social network provider.

Referring now to FIG. 2, a block diagram of an exemplary social network provider, such as the social network provider 130 shown in FIG. 1, is shown. The social network provider 130 includes a profile database 202, a communications interface 204, a monitoring module 206, a media database 210, a display engine/GUI 208, an activity database 212, and an advertising module 214. Although the social network provider 130 is described as being comprised of various components (the profile database 202, the communications interface 204, the monitoring module 206, the display engine/GUI 208, the media database 210, the activity database 212, and the advertising module 214), fewer or more components may comprise the social network provider 130 and still fall within the scope of various embodiments.

The profile database 202 is provided for storing data associated with each of the users, such as the user 101 associated with user device 110. When the user 101 subscribes to services provided by the social network provider 130, a user profile may be generated for user 101. For example, the user 101 may select privacy settings, provide contact information, provide personal statistics, specify memberships in various organizations, indicate interests, list affiliations, post class schedules, detail work activities, or group other users 101 according to one or more categories. When the user 101 adds additional information to the user profile, such as adding additional albums, the user profile in the profile database 202 may be updated with icons of the additional albums. The user profile may be stored, modified, added, and so forth to any storage medium. A timestamp may be associated with the user profile, in the profile database 202. Examples of timestamps include order of occurrence in the profile database 202, date, time of day, and the like.

According to some embodiments, the user profile is created outside of the social network environment 100 and provided to the profile database 202 for local access by the social network provider 130. Alternatively, the profile database 202 is located remotely and accessed by the social network provider 130.

The communications interface 204 is configured to communicate with users 101, such as via the user device 110 over the network 104. The user device 110 communicates various types of information, such as digital media (e.g., digital images), privacy settings selections, groupings of other users 101, and so forth, to the social network provider 130 via the communications interface 204. Any type of communications interface 204 is within the scope of various embodiments.

The monitoring module 206 tracks one or more user's 101 activities on the social network environment 100. For example, the monitoring module 206 can track the user's 101 interaction with one or more items of digital media, such as digital images, news stories, other users' 101 profiles, email to other users 101, chat rooms provided via the social network provider 130, and so forth. Any type of user activity can be tracked or monitored via the monitoring module 206. The information, digital media (e.g., digital images), people, groups, stories, and so forth, with which the user 101 interacts, may be represented by one or more objects, according to various embodiments. The monitoring module 206 may determine an affinity of the user 101 for subjects, other user's 101 digital images, relationships, events, organizations, and the like, according to users' 101 activities.

The display engine/GUI 208 displays the one or more items of digital media (e.g., digital images), profile information, and so forth, to users 101. Users 101 can interact with the social network provider 130 via the display engine/GUI 208. For example, users 101 can select albums, access individual digital images, access other users' 101 digital images available via the social network provider 130, and so forth, via the display engine/GUI 208. The albums and/or digital images may be displayed in a field in the display engine/GUI 208.

The media database 210 is configured to store data about digital media (e.g., digital images) for users 101. Information about the digital images includes album location, captions, tags, date information, access privileges, and the like. In various embodiments, the media owner 101a can assign an image to a selected album, associate captions with the images, and associate tags with the images, using the media database 210. In one embodiment, the media owner 101a may tag a digital image using the email address of the tagged user 101b and associating the email address with a region of the digital image. The association between the digital image and the email address may be stored in the media database 210. The media owner 101a can store access privileges to a digital image, according to groups, networks, and so forth, in the media database 210.

The activity database 212 is configured to store activity data (e.g., tracked by the monitoring module 206) about each user 101. The activities may be tracked by the monitoring module 206. Activities monitored by the monitoring module 206 may be stored in the activity database 212. Activity entries in the activity database 212 may include a timestamp indicating time and date of the activity, the type of activity, the user 101 initiating the activity, any other users 101 who are objects of the activity, and the like. Activities may be stored in multiple databases, including the activity database, the profile database, the relationship database, and so forth. Examples of activities stored in the activity database 212 include creating albums, uploading digital images, deleting digital images, deleting albums, tagging digital images, and/or the like. For example, an entry in the activity database 212 may record that a digital image was uploaded to an album at 14:52 on March 31, or that the digital image was tagged at 15:12 on March 31.

According to various embodiments, one or more networks are provided for each user 101 within the social network environment 100. For example, user 101 may have a network comprised of other users 101 within the social network environment who are grouped according to a university attended, a network comprised of people grouped according to the user's geographical location of residence, a network comprised of people grouped according to a common field of work, a network comprised of people grouped according to a particular business, and so forth. A common network may establish a relationship between user 101 and other users 101 in the common network.

The advertising module 214 is configured to provide advertising to users 101 via the communications interface 204 and/or the display engine/GUI 208. The advertising module 214 may determine appropriate advertising using the profile database 202, the monitoring module 206, and/or the activity database 212. For example, the monitoring module 206 may communicate to the advertising module 214 that a digital image upload is in progress via the communications interface 204. The advertising module 214 selects the advertising according to the profile of the user 101 in the profile database 202 and displays the advertising to the user 101 via the display engine/GUI 208 during the upload. Since the user 101 is likely to be focused on the display, watching for the upload to complete, the advertising module 214 may further tailor selection of the advertising for effect on the focused user 101.

Any type of network may be provided by the social network provider 130. In other words, a network may comprise people grouped according to any type of category, such as various social networks described herein, like "friends," "geographical location," and so forth. User 101 may specify the networks, the categories, subcategories, and so forth and/or these may be predetermined by the social network provider 130. The networks, categories, the subcategories, and so forth, may comprise a relationship with the user 101, as discussed herein, but do not necessarily comprise the only relationship user 101 has with the other users 101.

Figure 3A:
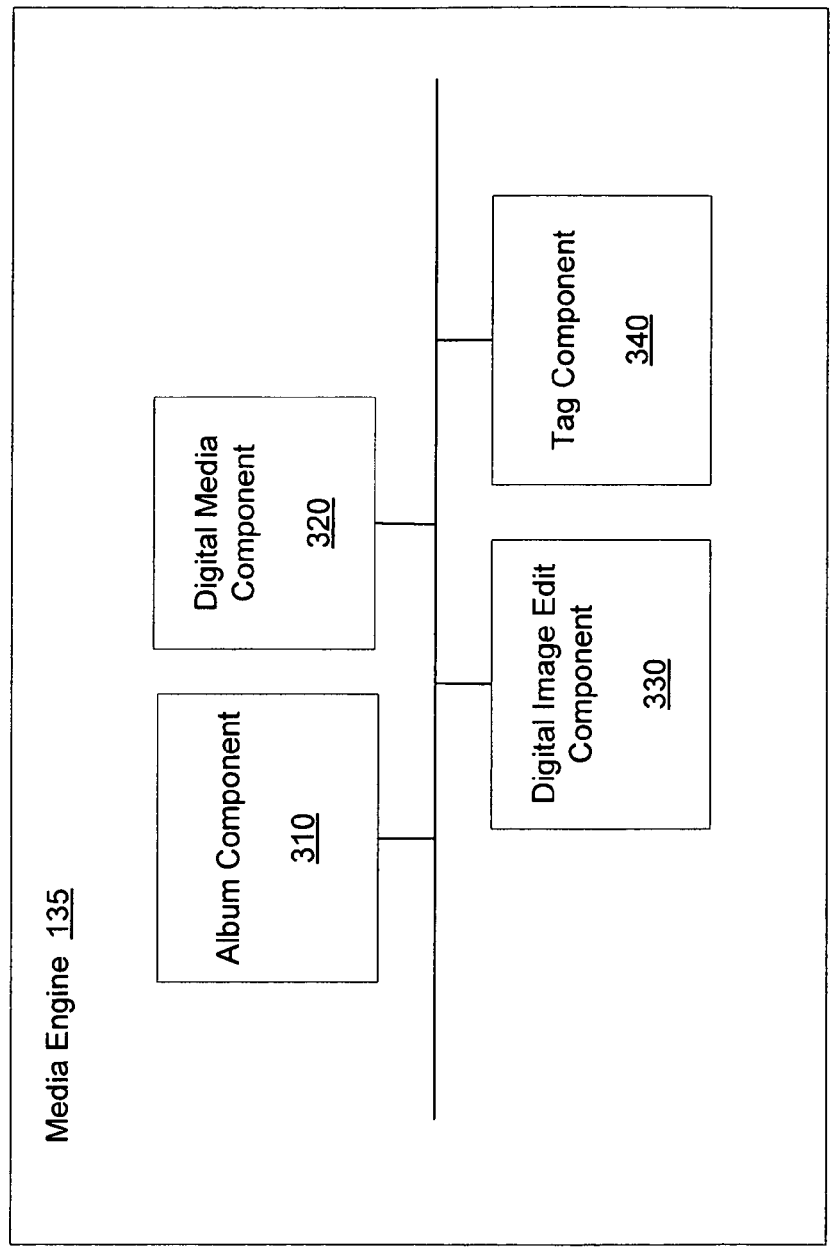
FIG. 3A is a block diagram of an exemplary media engine.

FIG. 3A is a block diagram of an exemplary media engine 135. The media engine 135 is configured to provide the user 101 media services for manipulating digital media (e.g., digital images) within the social network environment 100. Examples of digital image manipulation include creating albums within the user's 101 web page, uploading digital images to the user's 101 albums, associating captions with the digital images, tagging the digital images with information about regions within the digital images, deleting digital images, deleting albums, and the like.

The media engine 135 includes an optional album component 310, a digital media component 320, a digital image edit component 330, and a tag component 340. Although the media engine 135 is described as being comprised of various components (e.g., the album component 310, the digital media component 320, the digital image edit component 330, and the tag component 340), fewer or more components may comprise the media engine 135 and still fall within the scope of various embodiments.

The album component 310 is configured to create albums and/or delete albums. An album may be a collection of digital media (e.g., digital images, digital audio, digital video, and/or the like). Various embodiments of an album include a list of digital media, a folder containing media files, a file, and or the like.

Figure 3B:
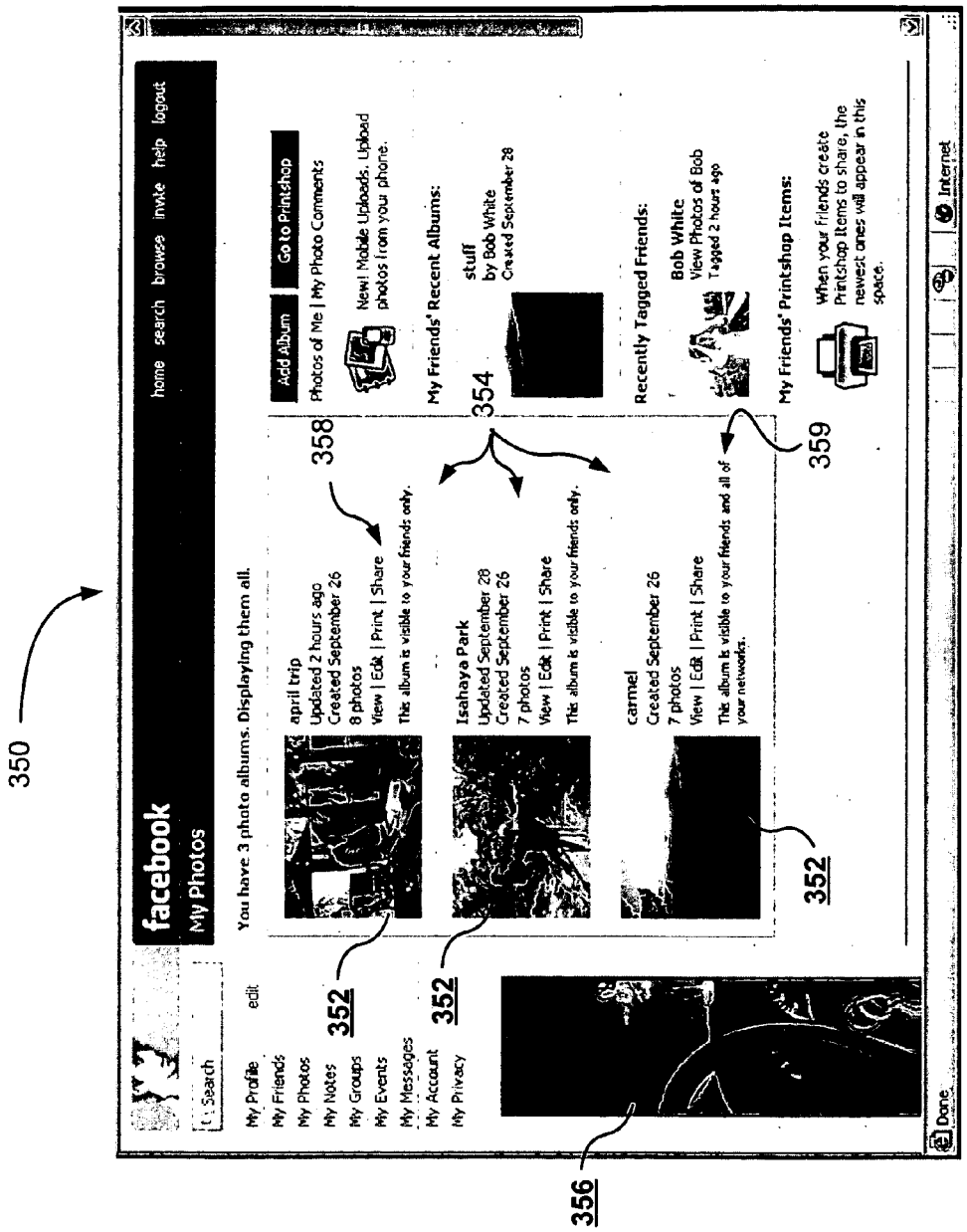
FIG. 3B is an exemplary screen shot of an album web page.

FIG. 3B is an exemplary screen shot of an album web page 350. The album web page 350 includes one or more album icons 352. In various embodiments, creating an album includes assigning a name to the album, recording a time stamp for the album, recording descriptive text about the album, assigning access privileges for who can view and/or modify the contents of the album, and the like.

The album component 310 is further configured to display information about the album. In some embodiment, the information about the albums includes a list of albums and the number of albums associated with the user 101. The album component 310 further includes an optional album caption 354. The album caption 354 may include, in various combinations, an album name, a time stamp, descriptive text about the album, privilege information, the number of digital images in the album, the access privileges, and the like. In some embodiments, the album component 310 uses a digital image from the album as the album icon 352. In various embodiments, the album component 310 displays further information about the albums including which album is the most recently updated, which album is the most popular, which albums contain digital images that have been tagged by other users 101, and/or the like.

Optionally, the album component 310 displays advertising 356, which may be received from the advertising module 214. In various embodiments, the album component 310 includes one or more links 358 and software code configured to view the album and/or the contents of the album, edit the album and/or the contents of the album, print the album and/or contents of the album, share the album and/or the contents of the album with other users 101, and the like. In some embodiments, a privacy setting 359 may be associated with the album by the album component 310. The privacy setting 359 may limit access to, for example, users 101 who are friends of the media owner 101a, any user 101 of the social network environment 100 who is within the media owner's 101a personal network, any user 101 of the social network environment 100, and so forth.

Figure 3C:
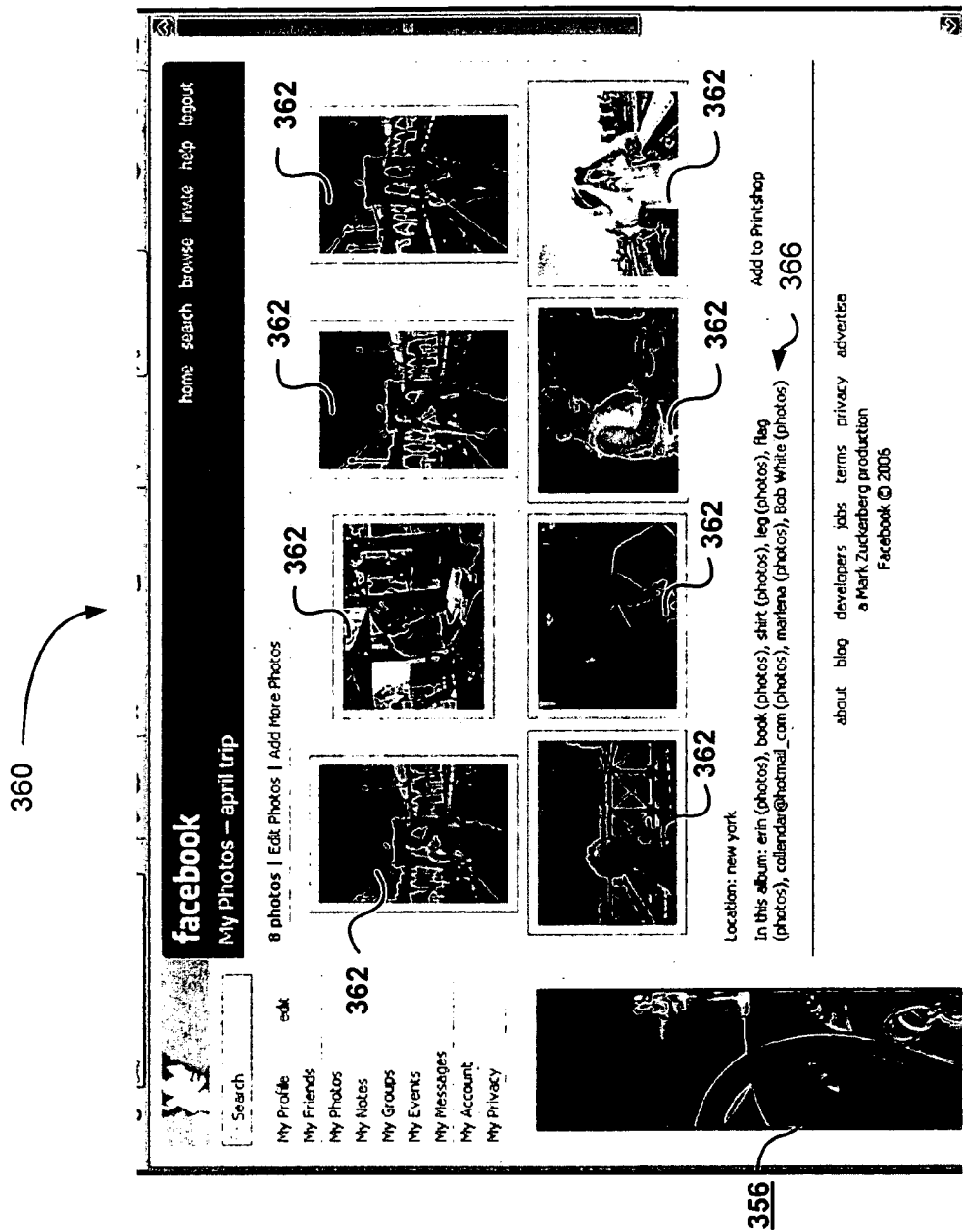
FIG. 3C is an exemplary screen shot of a digital image web page.

FIG. 3C is an exemplary screen shot of a digital image web page 360. The digital media component 320 is configured to upload digital media (e.g., one or more digital images 362) to an album. In various embodiments, the digital images 362 may be uploaded from a local disk on the user device 110, a personal digital assistant, a cell phone, a camera, remote user device 110, and the like. Optionally, the digital media component 320 resizes the digital image 362 while uploading the digital image 362. The digital images 362 may be uploaded to a storage device associated with the social network environment (e.g., a storage device on the user device 110, the social network provider 130, and/or the like). According to some embodiments, the digital images 362 are stored outside of the social network environment 100 and provided to the digital media component 320 for local access via the social network provider 130. Alternatively, the digital images 362 are located remotely and accessed by the social network provider 130. The digital media component 320 is further configured to delete digital images 362 from the album.

The digital media component 320 is further configured to display information about the digital images 362. In some embodiments, the information about the digital images 362 includes a list of digital images 362 in the album and the number of digital images 362 in the album that are associated with the user 101. In various embodiments, the information further includes, for each digital image 362, the name of the digital image 362, a representative icon, a date stamp, the access privileges, and the like. In some embodiments, the digital media component 320 provides the user 101 an option to select a digital image 362 for use in the album as the representative icon for an album. In various embodiments, the digital media component 320 displays further information about the digital images 362 including which digital image 362 is the most recently updated, which digital image 362 is the most popular, which digital images 362 have been tagged by other users 101, and the like. Optionally, the digital media component 320 displays advertising 356, which may again be received from the advertising module 214. In various embodiments, the digital media component 320 includes links and software code configured to view the digital image 362, edit the digital image 362, print the digital image 362, share the digital image 362 with other users 101, and the like. In some embodiments, the digital media component 320 includes a tag list 366.

Figure 3D:
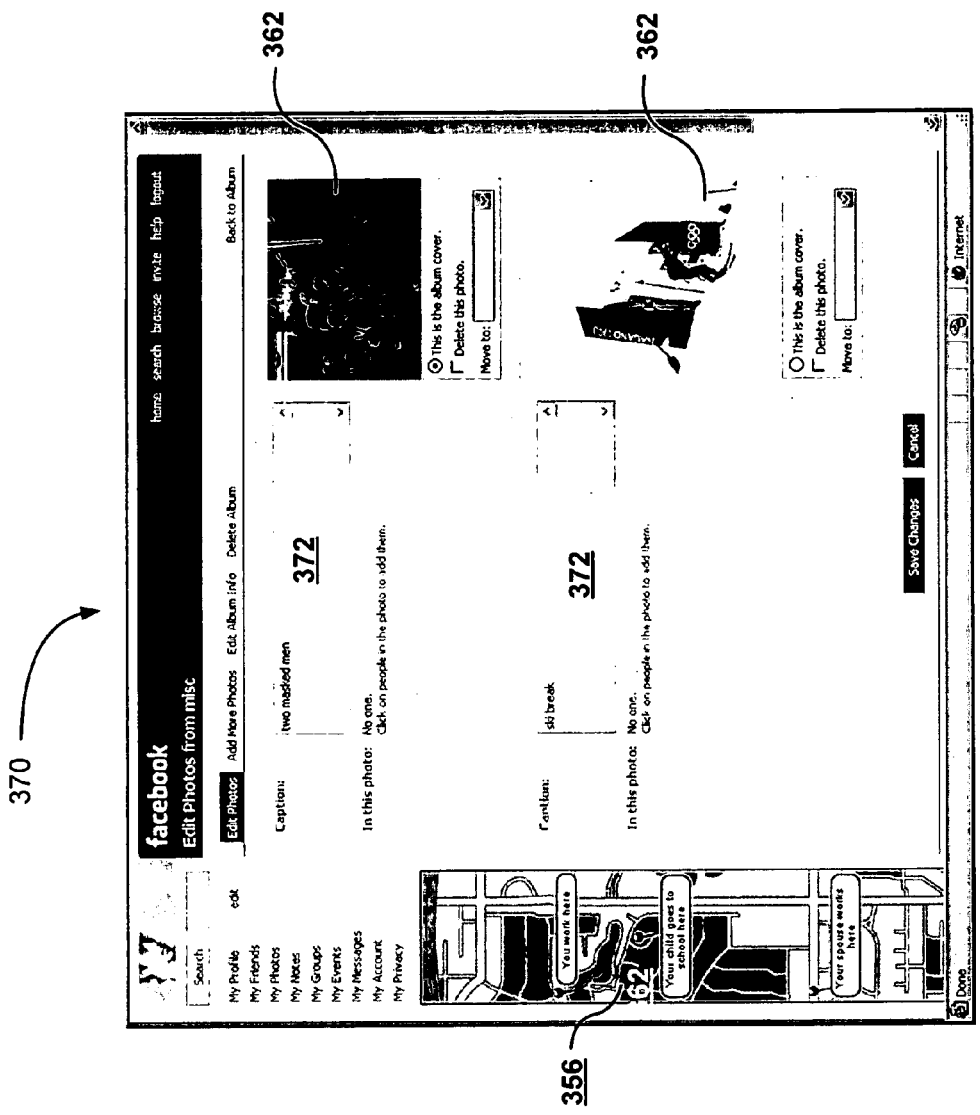
FIG. 3D is an exemplary screen shot of a digital image edit web page.

FIG. 3D is an exemplary screen shot of a digital image edit web page 370. The digital image edit component 330 is configured to provide the user 101 with various editing functions to apply to the digital images 362. In various embodiments, the editing functions include rotation, sizing, color adjustment, cropping, tagging, and the like. For example, captions for the digital images 362 may be entered in a caption text entry box 372. In some embodiments, a radio button may be used to designate the corresponding digital image 362 as the album icon 352. The tag component 340 is configured to select a region in the image and associate text with the region. In some embodiments, the tag component 340 includes digital image editing functions.

Although digital images 362 and information about the digital images 362 are described as being manipulated and/or displayed by the various components of media engine 135, the media engine 135 may manipulate and display information about various other forms of digital media, including digital images, digital video, digital audio, digital audiovisual media, digital text, and/or the like.

Figure 4:
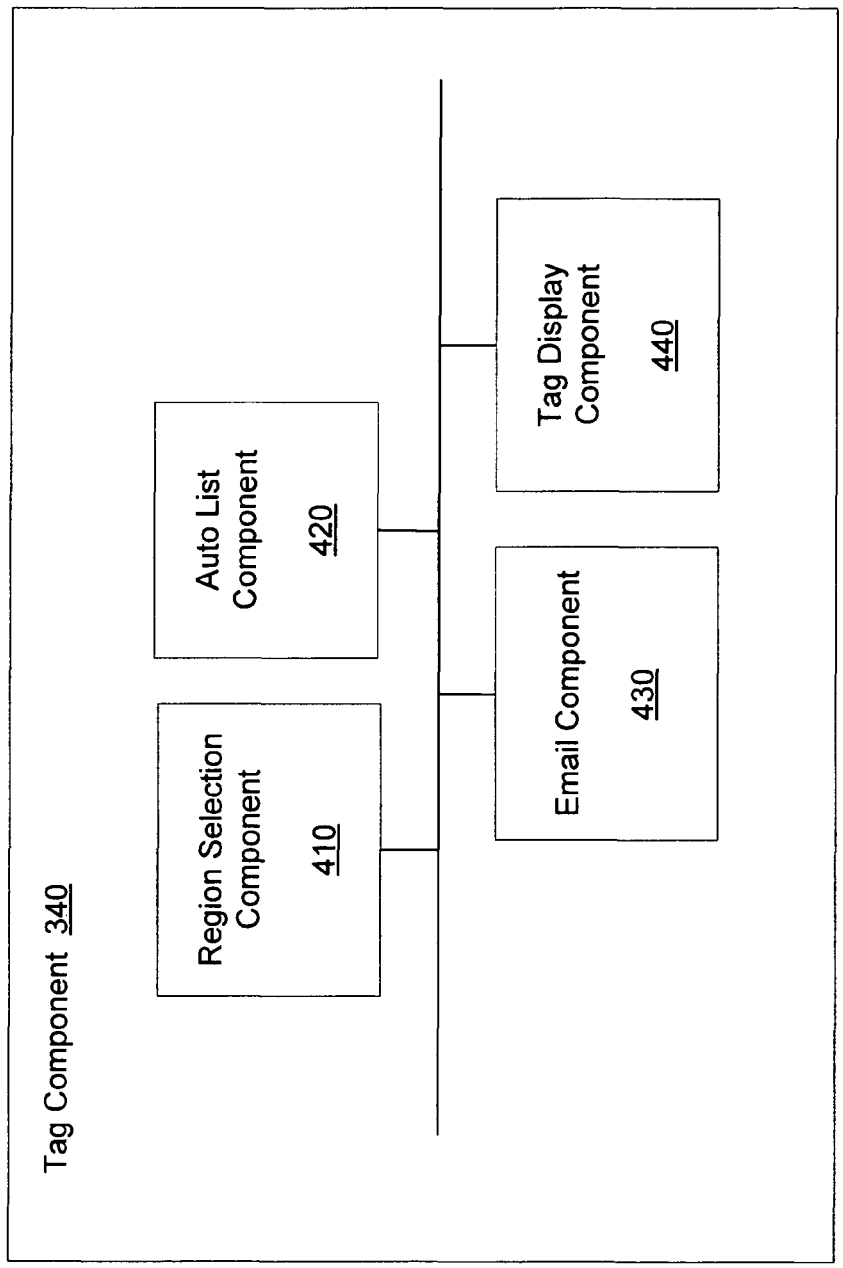
FIG. 4 is a block diagram of an exemplary tag component.

FIG. 4 is a block diagram of an exemplary tag component 340. The tag component 340 includes a region selection component 410, an auto list component 420, a tag display component 440, and an email component 430. The operation of these components is discussed below with reference to FIG. 5. Although the tag component 340 is described as being comprised of various components (e.g., the region selection component 410, the auto list component 420, the email component 430, and the tag display component 440), fewer or more components may comprise the tag component 340 and still fall within the scope of various embodiments. Although the tag component 340 is described as operating on digital images 362, the tag component 340 may operate on various digital media, e.g., digital images, digital video, digital audio, digital audiovisual media, digital text, and/or the like.

Figure 5:
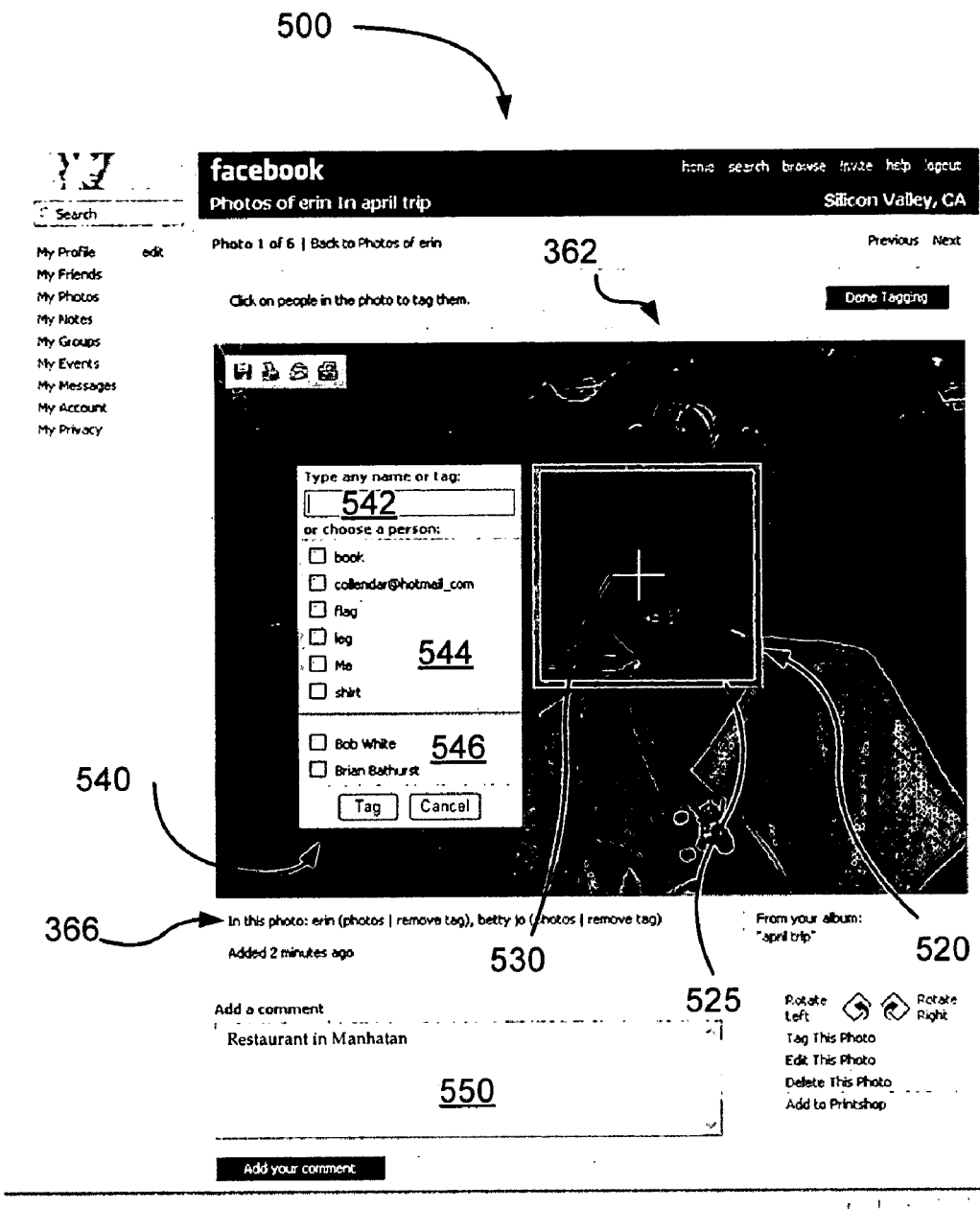
FIG. 5 is an exemplary screen shot of a tag web page.

FIG. 5 is an exemplary screen shot of a tag web page 500 illustrating various functions of the components of the exemplary tag component 340. The region selection component 410 is configured to receive input from a user 101 (e.g., the media owner 101a, the tagged user 101b, and etc.) and/or a non-member, (e.g., the tagged non-user 102). The region selection component 410 is further configured to select a region (e.g., a selected region 520) within a digital image 362 according to the input. In some embodiments, the user 101 moves a cursor 530 on the user device 110 to a point in the digital image 362 using a mouse, trackball, track pad, or the like. The user 101 clicks on the point and the region selection component 410 places a border 525 around the selected region 520. In various embodiments, the shape of the selected region 520 may be a rectangle, circle, ellipse, or polygon. The size of the selected region 520 may be fixed, may be determined by the user 101, or may be automatically determined. In various embodiments, the point the media owner 101a clicks on may be in the center, a corner, or some other location of the selected region 520.

The social network environment 100 further includes a media engine 135. The media engine 135 is configured to provide the user 101 media services for manipulating media (e.g., digital images) within the social network environment 100. Examples of digital image manipulation include creating albums within the user's 101 web page, uploading digital images to the user's 101 albums, associating captions with the digital images, tagging the digital images with information about regions within the digital images, stacking digital images, deleting digital images, deleting albums, and the like.

A comment field 550 may contain text including general information related to the digital image 362. Text may be entered into the comment field 550 by the media owner 101a of the image.

The auto list component 420 is configured to present a list of likely tags to the user 101 to associate with the selected region 520. In one embodiment, a tag list 540 pops-up upon clicking on the selected region 520. The tag list 540 may include a text entry window 542 and a list of previously used tags. As text is entered in the text entry window 542, the list of previously used tags may be culled to include only those that match the text in some manner. In some embodiments, the list of previously used tags includes a text list 544 and a friends list 546. Examples of text strings in the text list 544 include names, words, objects, email addresses, phone numbers, user accounts, user names, text message numbers, voice mail user number, pager numbers, instant message addresses, and/or the like. Examples of entries in the friends list 546 include contacts within the social network environment 100, approved contacts, selected email addresses, selected phone numbers, selected instant message addresses, selected text message addresses, and/or the like. Clicking any of the previously used tags may associate the tag with the selected region 520. Clicking any of the entries in the friends list 546 may associate the friend's email address with the selected region 520.

Figure 6:
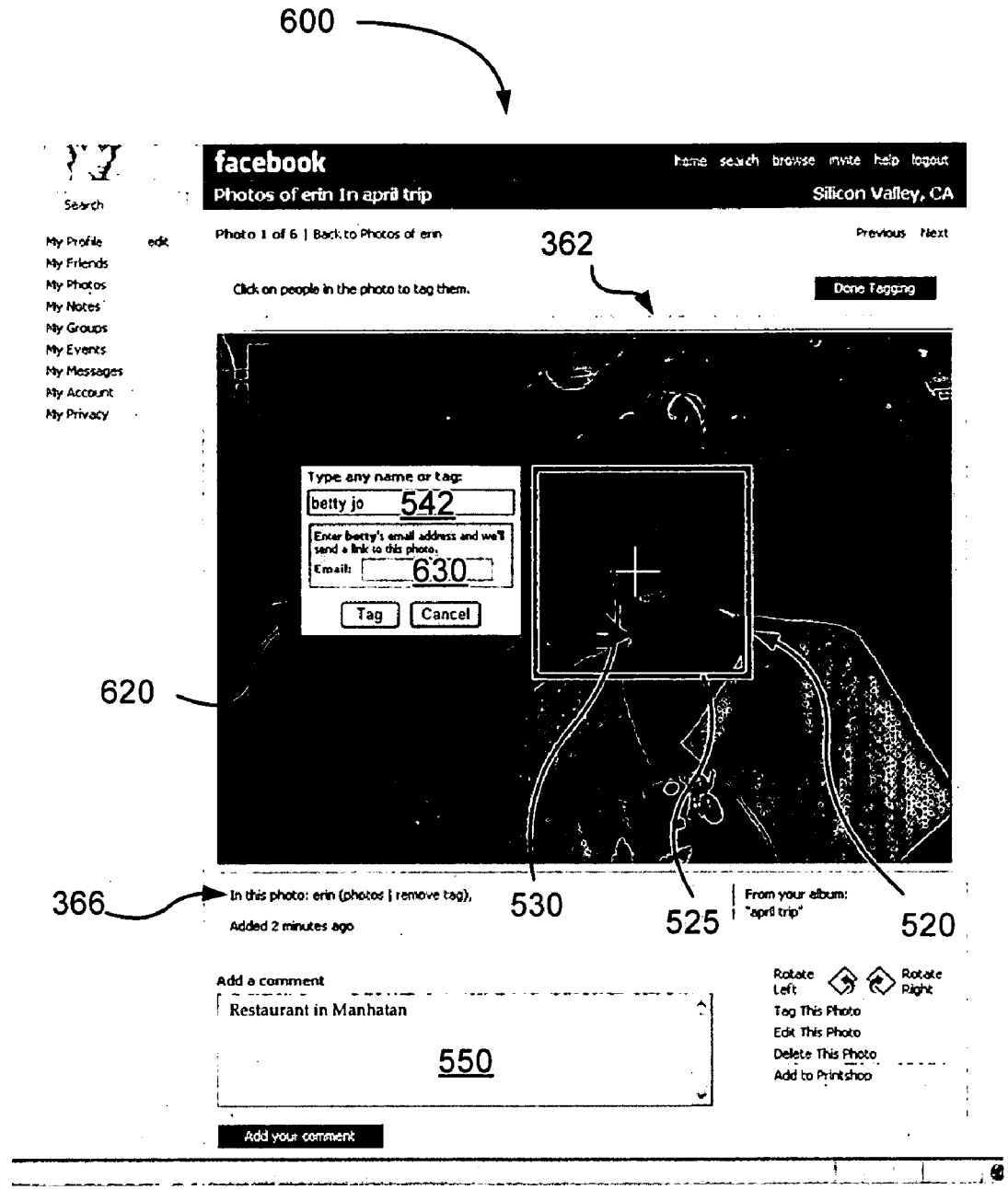
FIG. 6 is an exemplary screen shot of a tag web page.

Turning now to FIG. 6, an exemplary screen shot of a tag web page 600 further illustrating various functions of the components of the exemplary tag component 340 is shown. The tagged user 101b and/or the tagged non-user 102 may be notified that they have been tagged. The screen shot of the tag web page 600 differs from the tag web page 500 in that an email box 620 is displayed by the email component 430 on the digital image 362, instead of the tag list 540. The email component 430 may be configured to receive contact information (e.g., an email address) for a tagged non-user 102 and/or a tagged user 101b. In further embodiments, content information may also include a name of a person or entity, or information for a third person or entity. In some embodiments, the email component 430 is configured to send a notification to the tagged user 101b and/or to a tagged non-user 102, that they have been tagged in a digital image 362. Optionally, the email component 430 may be configured to send a notification to a third person or entity that a digital image 362 has been tagged.

In some embodiments, the email component 430 determines that text in the text entry window 542 may correspond to an unknown person, and presents the email box 620. The email box 620 includes an email entry field 630. If the user 101 enters an email address, the email component 430 is configured to send the notification to the email address entered in the email entry field 630.

If the email address entered in the email entry field 630 corresponds to a user in the social network (e.g., a tagged user 101b), the email notification may include a link to the tagged user 101b to view the tagged digital image 362 and/or confirm the tag. If the email address is not recognized by the email component 430 as an email address for a user 101 (e.g., a member of the social network environment 100) then the email component 430 may presume that the email address corresponds to a non-member (e.g., a tagged non-user 102). The email notification that may be sent to the tagged non-user 102 may include a link to view the tagged digital image 362 and/or confirm the tag. The email notification may further provide an invitation to become a member of the social network environment 100. In some embodiments, the tagged non-user 102 may be permitted to view the tagged digital image 362 but not confirm the tag until becoming a member of the social network environment 100. The email notification may further include advertising, e.g., advertising generated by the advertising module 214.

Figure 7:
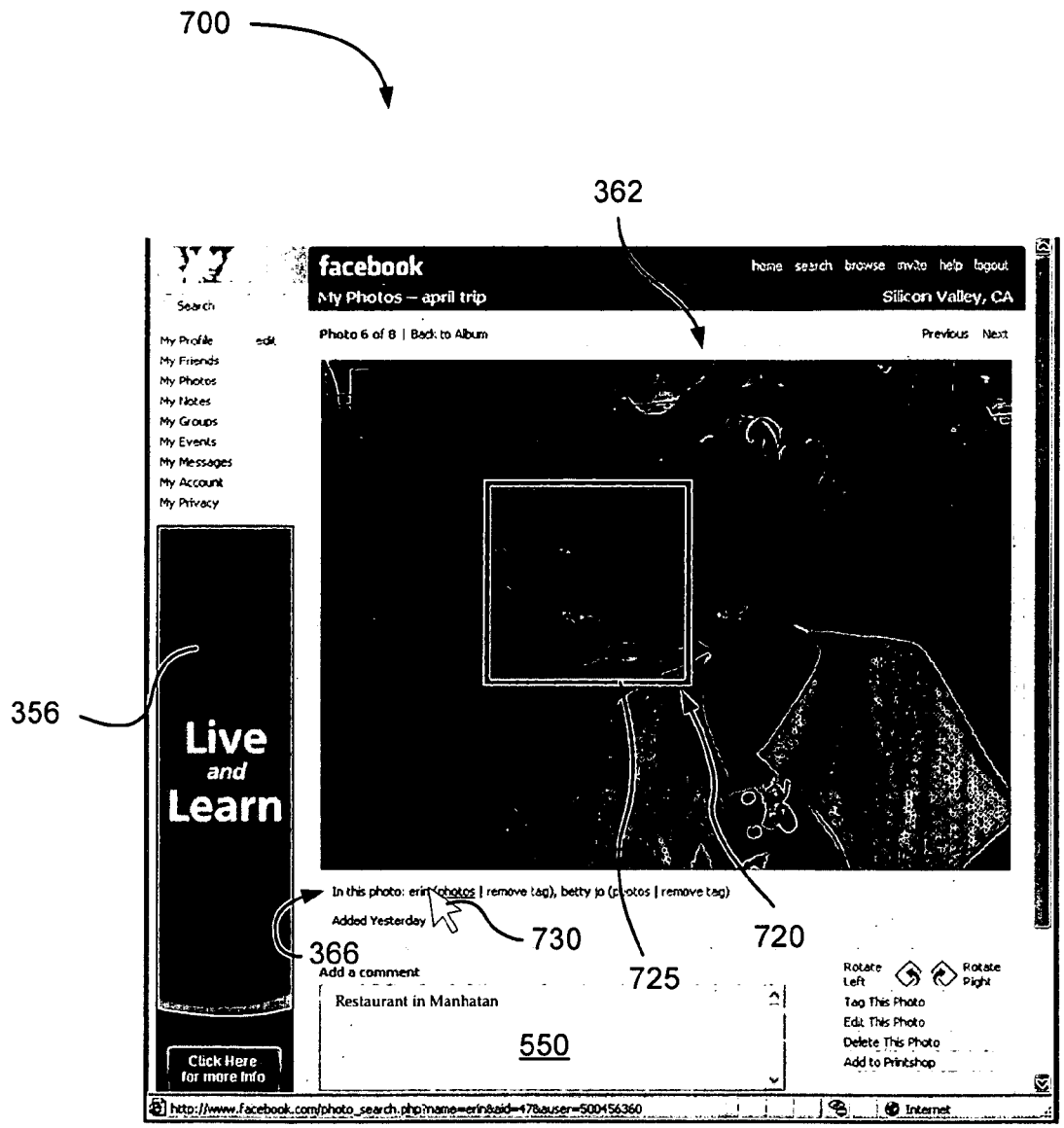
FIG. 7 is an exemplary screen shot of a tag web page.

Turning now to FIG. 7, an exemplary screen shot of a tag web page 700 is shown. FIG. 7 includes a selected region 720, a border 725, and a cursor 730. The screen shot of the tag web page 700 differs from the tag web page 500 in that the border 725 associated with a tag "erin" is displayed in a different location on the digital image 362 instead of the border 525. The selected region 720 differs from the selected region 520 in FIG. 5-6, in that a different region of the image 362 is selected. The cursor 730 differs from the cursor 530 in that the cursor 730 is pointing to the tag "erin" in the tag list 366 instead of a point in the image 362.

FIG. 7 illustrates the tag list 366 including two tags, namely, "erin" and "betty jo." The tag display component 440 is configured to permit the user 101 to display entries in the tag list 366 that have been associated with selected regions 720 in the digital image 362. Multiple selected regions 720 may be associated with tags. In one embodiment, the tag display component 440 highlights selected regions 720 associated with entries in the tag list 366 when the cursor hovers near and/or over entries in the tag list 366. FIG. 7 illustrates the cursor 730 hovering over the tag "erin" in the tag list 366. The tag display component 440 highlights the selected region 720 using the border 725. In some embodiments, the advertising module 214 provides advertising 356 to the tag display component 440 for display while the user 101 is viewing the digital image 362 and/or tags, or adding tags and/or adding comments.

Figure 8:
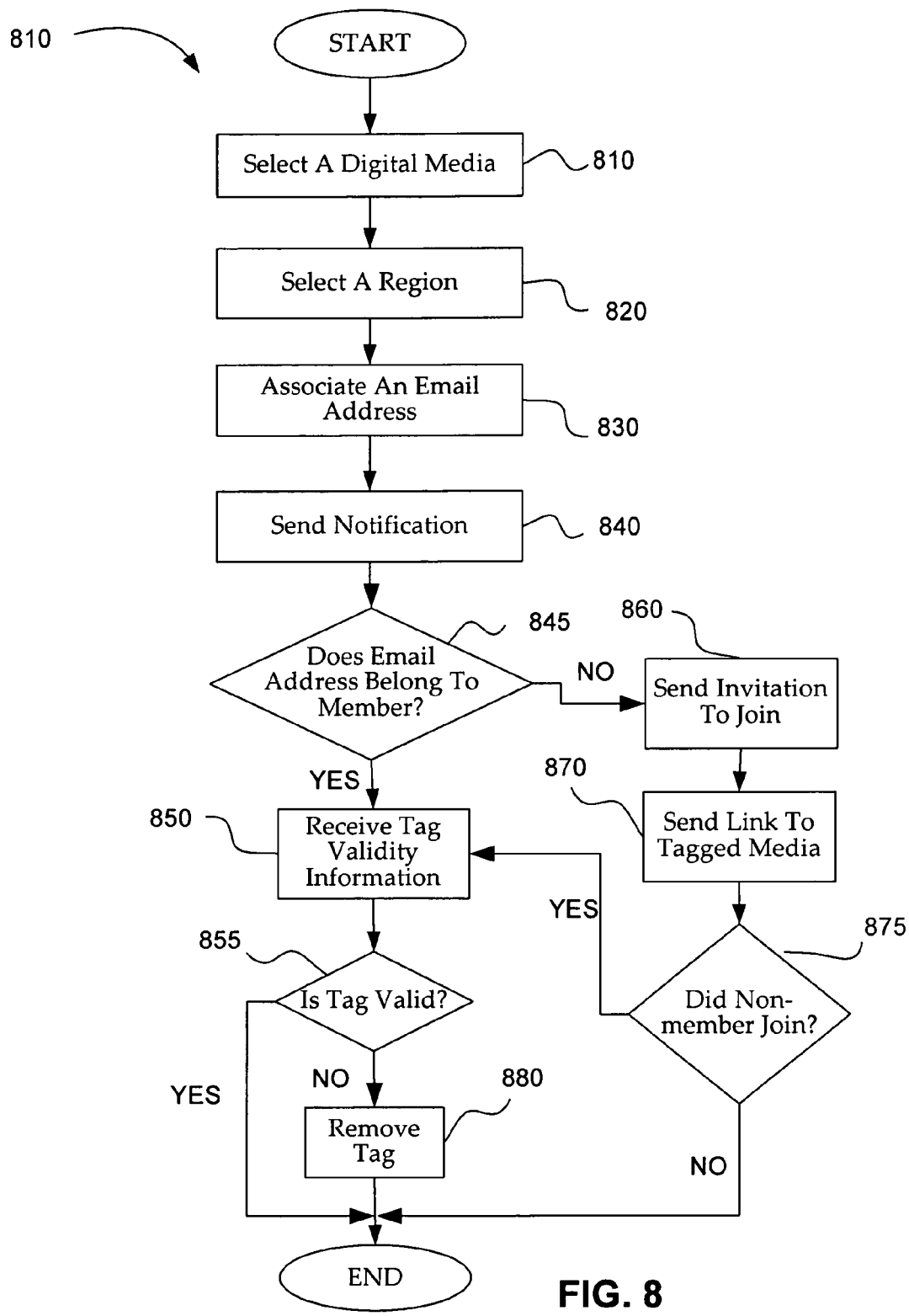
FIG. 8 is a flow diagram of an exemplary process for tagging digital images in a social network.

FIG. 8 is a flow diagram of an exemplary process 800 for tagging digital media, (e.g., the digital images) such as in a social network (e.g., the social network environment 100). At step 810, an item of digital media (e.g., a digital image 362) in the social network environment 100 is selected for tagging. In various embodiments, the digital image 362 is selected by a member of the social network environment 100, e.g., a user 101, the media owner 101a, the tagged user 101b, and the like, via a user device 110. In some embodiments, the digital image 362 is selected by a non-member of the social network environment 100. The social network provider 130 may receive the selection from the user 101 via the communications network 120.

At step 820 a region (e.g., the selected region 520) in the digital image 362 is selected for association with a tag. In some embodiments, the user 101 selects the selected region 520 using a mouse, trackball, touch pad, or the like to move a cursor (e.g., the cursor 530) to a point within the image 362, and clicking on the point. Optionally, the user 101 clicks on a point with the cursor 530 and drags the cursor 530 to another point (e.g., click and drag) to define the selected region 520. In some embodiments, the region selection component 410 displays a border (e.g., the border 525) to indicate the selected region 520.

At step 830 contact information (e.g., an email address) is associated with the selected region 520 using a tag. Contact information may also include a name of a person or entity, or information for a third person or entity. A tag in the form of text may be associated with the selected region 520. In various embodiments, the text may include a hyperlink, an email address and/or user address of a friend in the social network environment 100, an email address and or user address of a user 101 of the social network environment 100, an email address of a non-member of the social network environment 100, a phone number, an instant text message address, a pager number, a text message number, a mailing address, and/or the like. The tag may be input by the user 101. In some embodiments, the tag is suggested by the auto list component 420 of the tag component 340. Optionally, the social network provider 130 selects the tag.

At step 840 a notification of the tag is sent. In one embodiment, the notification of the tag is sent to the email address associated with the selected region 520, for example, using the email component 430. In further embodiments, the notification of the tag is sent to a third person or entity. In some embodiments, the notification includes a link enabling the tagged user 101b, or the tagged non-user 102, to view the tagged digital image 362. Optionally, the notification sent at step 840 includes an invitation to become a member of the social network environment 100 and/or advertising, e.g., advertising generated by the advertising component module 214.

At step 845 it is determined if the email address belongs to a user 101 who is member of the social network environment 100 (e.g., the tagged user 101b). If the email address belongs to the tagged user 101b then the method proceeds to step 850 in which tag validity information is received from the tagged user 101b. In some embodiments, step 850 includes displaying the digital image 362 and tag to the tagged user 101b and providing the tagged user 101b an option to confirm the tag or disaffirm the tag (e.g., using radio buttons).

At step 855 it is determined if the tag is valid. For example, if the tagged user 101b confirms the tag in step 850 then the tag is valid. However, if the tagged user 101b disaffirms the tag in step 850 then the tag is not valid. If the tag is valid, the method 800 ends. If the tag is not valid then the method proceeds to step 880 and removes the tag and ends. In some embodiments, the media owner 101a can override the validity information. Optionally, the tag is hidden from users 101 other than the media owner 101a instead of removed.

If the email address does not belong to a user 101 who is a member of the social network environment 100 (e.g., belongs to the tagged non-user 102) the method proceeds to step 860. In step 860 an invitation is sent to the tagged non-user 102 to become a member of the social network environment 100. The invitation to become a member of the social network environment 100 may include a link to a membership registration web page. Optionally, the advertising module 214 attaches advertising to the invitation to become a member of the social network environment 100 at step 860. In optional step 870, a link is sent to the digital image 362 that will enable the tagged non-user 102 to view the digital image 362 and the tag associated with a region 520. In an alternative embodiment, at step 870 the digital image 362 associated with the tagged text, is sent to the tagged non-user 102 for viewing the digital image 362 and the tagged text associated with the region 520.

In one embodiment, the tagged non-user 102 follows the link to the membership registration web page and optional step 875 determines if the tagged non-user 102 has become a member of the social network environment 100. The process proceeds to step 850 upon completion of the registration. If the tagged non-user 102 elects not to become a member of the social network environment 100, the method 800 ends. In some embodiments, if the tagged non-user 102 elects to become a member, the tagged non-user 102 becomes a tagged user 101b and thus may review the digital images 362 that have been tagged with the new tagged user's 101b email address at any time.

Several embodiments are specifically illustrated and/or described herein. However, it will be appreciated that modifications and variations are covered by the above teachings and within the scope of the appended claims without departing from the spirit and intended scope thereof. For example, media may be tagged with hyperlink to advertising. For example, video clips may be tagged. For example audio may be used instead of text to tag the digital media. For example, digital images may be used instead of text to tag the digital media. For example, hyperlinks to video may be used instead of text to tag the digital media. For example, objects in online games may be tagged. Various embodiments of the invention include logic stored on computer readable media, the logic configured to perform methods of the invention.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method comprising:
   receiving from a device of a first user a selection of an item of digital media, wherein the item of digital media is stored in a database;
   receiving from the device of the first user an identification of a person associated with the selected item of digital media;
   responsive to receiving the information identifying the person, sending a notification to a device of a second user that the person has been identified in connection with the item of digital media; and
   enabling the identified person to reject the identification, wherein the identified user is different from the first user.

2. The method of claim 1, wherein the notification comprises an email.

3. The method of claim 1, wherein the digital media is accessible in a social networking system, and the identified person is a user of the social networking system.

4. The method of claim 1, wherein the item of digital media comprises a digital image.

5. The method of claim 1, wherein the item of digital media comprises at least one of digital video, digital audio, and digital text.

6. The method of claim 1, wherein the second user is the person who has been identified in connection with the item of digital media, whereby the person identified in connection with the item of digital media is notified of the identification.

7. The method of claim 1, wherein the second user is a person other than the person who has been identified in connection with the item of digital media.

8. The method of claim 1, wherein sending the notification that the person has been identified further comprises:
   receiving contact information of the person from a server computer; and
   sending the notification to the person using the received contact information.

9. The method of claim 1, wherein the information identifying the person associated with the selected item of digital media is received from a user other than the first user.

10. The method of claim 1, further comprising:
    receiving a response from the person accepting the identification;
    responsive to receiving the response, storing at the server the identification of the person in connection with the item of digital media.

11. The method of claim 1, further comprising:
    receiving a response from the person rejecting the identification;
    responsive to receiving the response, removing the identification of the person in connection with the item of digital media.

12. The method of claim 1, further comprising:
    determining whether the identified person is a user of a social networking system; and responsive to determining that the identified person is not a user of the social networking system, sending to the person an invitation to join or use the social networking system.

13. The method of claim 1, wherein receiving information identifying the person comprises:
receiving one or more text characters;
displaying a list of names including the received text characters; and
receiving a selection of a name from the list.

14. The method of claim 1, further comprising:
receiving a selection of the item of digital media from a device of a third user;
responsive to receiving the selection of the item of digital media, displaying the item of digital media with a tag for the person identified in connection with the item of digital media.

15. The method of claim 14, wherein the tag comprises a link to a webpage associated with the person.

16. The method of claim 14, further comprising:
receiving a user interaction with the tag; and
responsive to receiving the user interaction with the tag, displaying on the item of digital media an indication of a region within the item of digital media associated with the person identified.

17. A computer program product comprising a non-transitory computer-readable storage medium containing computer program code for:
receiving from a device of a first user a selection of an item of digital media;
receiving from the first user an identification of a person associated with the selected item of digital media;
responsive to receiving the information identifying the person, sending a notification to a second user that the person has been identified in connection with the item of digital media; and
enabling the identified person to reject the identification, wherein the identified user is different from the first user.

18. The computer program product of claim 17, wherein the notification comprises an email.

19. The computer program product of claim 17, wherein the item of digital media comprises a digital image.

20. The computer program product of claim 17, wherein the item of digital media comprises at least one of digital video, digital audio, and digital text.

21. The computer program product of claim 17, wherein the second user is the person who has been identified in connection with the item of digital media, whereby the person identified in connection with the item of digital media is notified of the identification.

22. The computer program product of claim 17, wherein the second user is a person other than the person who has been identified in connection with the item of digital media.

23. The computer program product of claim 17, wherein sending the notification that the person has been identified comprises:
retrieving contact information of the person from a server computer; and
sending the notification to the person using the retrieved contact information.

24. The computer program product of claim 17, wherein receiving information identifying the person comprises receiving the information from a third user.

25. The computer program product of claim 17, wherein the medium further contains computer program code for:
receiving a response from the person accepting the identification;
responsive to receiving the response, storing the identification of the person in connection with the item of digital media.

26. The computer program product of claim 17, wherein the medium further contains computer program code for:
receiving a response from the person rejecting the identification;
responsive to receiving the response, removing the identification of the person in connection with the item of digital media.

27. The computer program product of claim 17, wherein the medium further contains computer program code for:
determining whether the identified person is a user of a social networking system; and
responsive to determining that the identified person is not a user of the social networking system, sending to the person an invitation to join or use the social networking system.

28. The computer program product of claim 17, wherein receiving information identifying the person comprises:
receiving one or more text characters;
displaying a list of names including the received text characters; and
receiving a selection of a name from the list.

29. The computer program product of claim 17, wherein the medium further contains computer program code for:
receiving a selection of the item of digital media from a third user;
responsive to receiving the selection of the item of digital media, displaying the item of digital media with a tag for the person identified in connection with the item of digital media.

30. The computer program product of claim 29, wherein the tag comprises a link to a webpage associated with the person.

31. The computer program product of claim 29, wherein the medium further contains computer program code for:
receiving a user interaction with the tag; and
responsive to receiving the user interaction with the tag, displaying on the item of digital media an indication of a region within the item of digital media associated with the person identified
receiving from a device of a first user a selection of an item of digital media.

32. A method comprising:
receiving from a device of a first user information tagging an entity in association with an item of digital media, wherein the item of digital media is stored in a database;
storing the association between the identified entity and the item of digital media;
responsive to receiving the information tagging the entity in association with the item of digital media, sending a notification of the tagging to a device of a second user; and
enabling the second user to reject the identification, wherein the identified entity is different from the first user.

33. A method comprising:
receiving from a device of a first user a selection of a region of the item of digital media, wherein the item of digital media is stored in a database;
receiving information identifying a person associated with the selected region of the item of digital media;

receiving a selection of the item of digital media from a device of a second user;

responsive to receiving the selection of the item of digital media from the device of the second user, displaying the item of digital media to the device of the second user with a tag for the person who was identified in connection with the item of digital media, wherein the tag comprises a link to a page of information associated with the person; and enabling the identified person to reject the identification, wherein the identified user is different from the first user.

34. The method of claim 33, further comprising:

receiving a user selection of the tag; and responsive to receiving the selection of the tag, displaying on the item of digital media an indication of the region within the item of digital media associated with the identified person.

\* \* \* \* \*

UNITED STATES PATENT AND TRADEMARK OFFICE
CERTIFICATE OF CORRECTION

| | | |
|---|---|---|
| PATENT NO. | : 7,945,653 B2 | Page 1 of 1 |
| APPLICATION NO. | : 11/580210 | |
| DATED | : May 17, 2011 | |
| INVENTOR(S) | : Mark E. Zuckerberg, Aaron Sittig and Scott Marlette | |

It is certified that error appears in the above-identified patent and that said Letters Patent is hereby corrected as shown below:

On the Title Pg. Item (56) 2nd col. line 8, please insert the following reference:

--2008/0033776 A1*  2/2008  Marchese--

Signed and Sealed this
Twenty-sixth Day of July, 2011

David J. Kappos
*Director of the United States Patent and Trademark Office*